Inventor
Jo D. Berwick
By
Attorney

Patented May 12, 1931

1,805,032

UNITED STATES PATENT OFFICE

JO D. BERWICK, OF AKRON, OHIO, ASSIGNOR TO THE GOODYEAR TIRE & RUBBER COMPANY, OF AKRON, OHIO, A CORPORATION OF OHIO

DRUM FOR MANUFACTURING ENDLESS RUBBER ARTICLES

Application filed April 16, 1929. Serial No. 355,642.

This invention relates to the manufacture of endless rubber belts and it has particular relation to drums upon which belts are assembled and vulcanized.

One object of the invention is to provide a sectional drum for manufacturing endless rubber belts in which only the end sections are supported upon a rotatable shaft.

Another object of the invention is to provide a sectional drum composed of sheet metal.

Heretofore, in the manufacture of endless articles composed of rubber and, in particular, the manufacture of belts having a V-shape, the latter have been formed on drums having V-shape circumferentially disposed grooves in their outer surfaces. The belts were either assembled in these grooves by winding rubber and fabric therein or first were assembled and subsequently disposed in the grooves for vulcanization. These drums necessarily have been divided along the bases of the several grooves in order to permit separation of the sections thus formed and removal of the finished belts. The patent to Gates No. 1,354,738, issued October 5, 1920, discloses a drum of this character which has successfully been employed in this manner heretofore.

According to this invention, the several sections of the drum are disposed in encircling relation to a shaft and are retained together by a pair of discs adjustably secured to the shaft and provided with means for exerting pressure toward each other against the end sections. One end of each section is cylindrical in form, whereas its other end projects outwardly of the cylindrical portion to form a flange or rib. A portion of the outwardly projecting end of the section, however, has an inner diameter substantially equal to the outer diameter of the cylindrical portion. By reason of this construction, the sections may partially be telescoped in order to prevent their relative movement perpendicularly to the shaft. In the assembled drum, the outwardly projecting ends of the sections are spaced and thereby form grooves in which endless belts may be formed or vulcanized. Owing to the fact that the cylindrical portions of the sections form the bases of the grooves, separation of the sections readily permits the removal of the belts by sliding them over the cylindrical portions.

Figure 1:
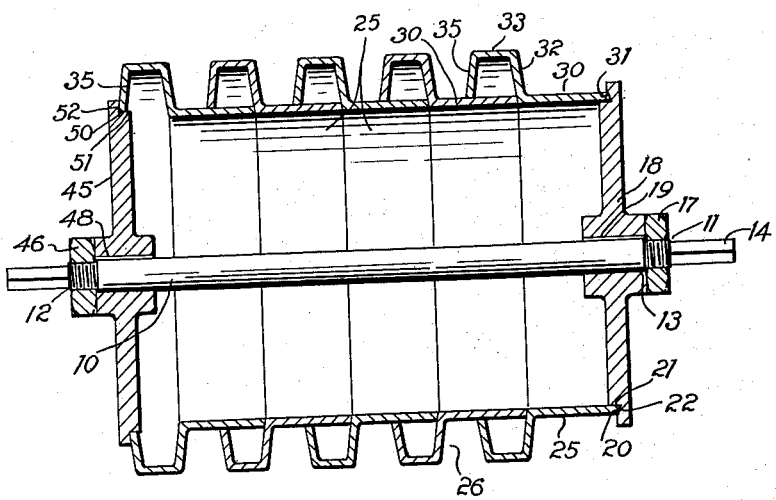
Figure 5:
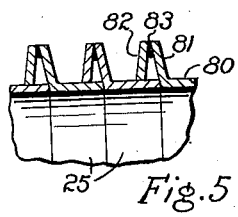
Figure 6:
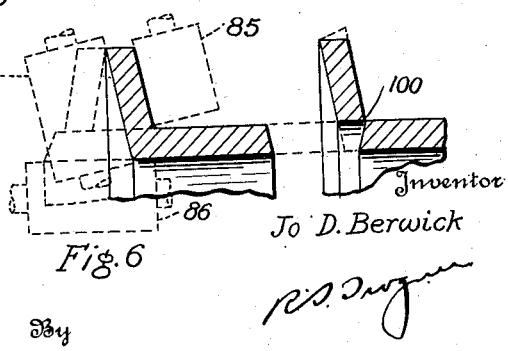

For a better understanding of the invention, reference may now be had to the accompanying drawing, forming a part of the specification, of which:

Fig. 1 is a cross-sectional view of a drum constructed according to one embodiment of the invention;

Figs. 2, 3, 4, and 5 are fragmentary cross-sectional views of other forms of drum constructions similar to that disclosed by Fig. 1; and Fig. 6 illustrates a method of forming the construction shown by Fig. 5.

Referring to Fig. 1, a shaft 10 is provided at its ends with reduced threaded portions 11 and 12 and an intermediate unthreaded portion 13. Outwardly of the portions 11 and 12, the shaft 10 is of square or polygonal shape, as indicated at 14, in order that it may be rotated by engagement with clutch members (not shown) adapted to receive the ends of the shaft. A nut 17, threaded on the portion 11 of the shaft 10 retains a disc 18 slidably keyed, as indicated at 19, adjacent one end of the unthreaded portion 13.

An annular recess 20, formed in the inner side of the disc at the outer edge thereof, is defined by a cylindrical surface 21 and a surface 22 inclined to the shaft 10. This recess is adapted to receive one end of a section 25 of a sectional drum 26 composed of sheet metal. Each section is provided with a cylindrical portion 30, the end of which is so inclined as indicated at 31, that it rests snugly against the inclined surface 22 of the recess 20. The cylindrical portion 30 has an inner diameter substantially equal to the diameter of the cylindrical surface 21 so that in its normal position, it rests uniformly on the latter.

The opposite end of the section 25 is directed first outwardly from the portion 30 at an oblique angle thereto, as indicated at 32. Then, it is directed parallel to the shaft 10, as indicated at 33, and inwardly as indicated at 35, toward the shaft 10 at an angle in such manner that the portions 32 and 35 converge outwardly. Thus, the portions 32, 33 and 35 form an annular channel having its legs directed toward the axis of the section. The inner end of the oblique portion 35 of the section has an inner diameter equal substantially to that of the outer diameter of the cylindrical portion 30 and the cylindrical portion 30 of an adjacent section fits snugly within the inner end of the portion 35 of the first mentioned section. The portion 30 abuts the portion of the section defined by the junction of portions 30 and 32 of each succeeding section. In this manner, as many sections may be assembled in telescopic relation as are found desirable. The length of the cylindrical portion 30 is greater than the distance between the base portions of the inclined portions 32 and 35, and hence when the sections are assembled, a groove having a V-shape is formed between the inclined portions 32 and 35 of adjacent sections.

The sections are retained against the disc 18 by a second disc 45, mounted on the end of the shaft opposite the first mentioned disc and retained thereon by a nut 46 threaded on the threaded portion 12 of the shaft. Like the disc 18, the disc 45 is keyed, as indicated at 48, to the shaft to rotate therewith. The outer edge of the disc is provided with a recess 50 defined by a cylindrical surface 51, upon which the inner peripheral edge of the portion 35 of the end section adjacent thereto rests and an inclined surface 52, which abuts the outer surface of the inclined portion 35 of the section.

It is evident that the nuts 17 and 46 retain the discs 18 and 45 against the end sections of the drum and that the drum may be disassembled by removing such nuts and the discs. Moreover, the sections are prevented from relative movement perpendicularly to the shaft 10 by the cylindrical portion 30 of each section which underlies and supports the portion 35 of an adjacent section.

Figure 2:
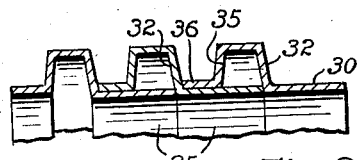

Figure 2 discloses another form of the aforedescribed drum in which the inclined portion 35 of each section is provided at its inner end with a cylindrical portion 36, extending to and abutting the inclined portion 32 of the adjacent section.

Figure 3:
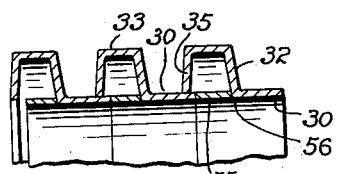

In the construction disclosed by Fig. 3, the sections 25 of the drum are substantially the same as those disclosed by Fig. 1 with the exception that the cylindrical portion 30 of each section is of lesser length and extends a shorter distance beyond the inner end of the portion 35 of each section. Instead of the cylindrical portion 30 abutting the portion 32 of an adjacent section, as heretofore described in regard to Fig. 1, it abuts a cylindrical portion 55 projecting from the junction of the portions 30 and 32 and welded thereto, as indicated at 56.

Figure 4:
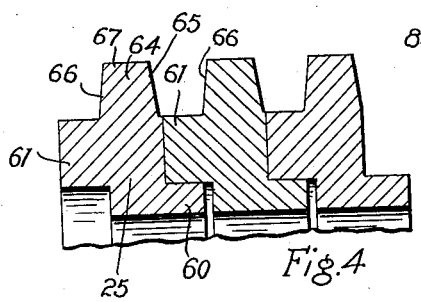

Figure 4 discloses a form of drum, in which the sections 25, instead of being composed of sheet metal, are formed of cast metal. Each section 25 is provided with a portion 60 projecting from one end in a direction parallel to the axis of the section, and an oppositely directed portion 61 projecting from its opposite end. The last mentioned portion has an inner diameter substantially equal to the outer diameter of the first mentioned portion, so that adjacent sections have a partially telescopic engagement. Intermediate the portions 60 and 61, the section is provided with an outwardly projecting flange or rib 64, having oppositely inclined sides 65 and 66 and a cylindrical outer surface 67. When the sections are assembled, as illustrated, the adjacent surfaces 65 and 66 and the outer cylindrical surface of the portion 61, define a circumferentially disposed groove of V-shape similar to the grooves illustrated by Figs. 1, 2 and 3.

According to the construction shown by Fig. 5, each section 25 is provided with a cylindrical portion 80 having a portion 81 projecting obliquely and outwardly from one end thereof. The latter portion, at its outer end, is welded to the outer end of an oppositely inclined portion 82 as indicated at 83. Since the inner end of the portion 82 has a diameter substantially equal to the outer diameter of the portion 80, it follows that the cylindrical portion 80 of one section may be projected beneath the inner end of the portion 82 of an adjacent section and the sections assembled in telescopic relation.

Fig. 6 illustrates one method that may be employed in forming the sections of the drum shown by Fig. 5. Initially, a cylindrical band of sheet metal is provided having a length equal to the combined length of the portions 80 and 81 of a completed section. This band then is disposed between an outer roller 85 and an inner roller 86 for rolling it to desired form. Initially the roller 86 has its axis parallel to the inner surface of the band, and is engaged with the inner surface of the band over a length corresponding to that of the portion 81 of the finished section of drum. The roller 85 on the outer side of the band has its axis inclined to the outer surface of the band, a degree equal to the inclination of the portion 81 of the section. The lower edge of this roller is engaged with the band at a point which divides the latter into parts equal in length to the portions 80 and 81 of the section. By retaining the roller 85 stationary and rolling the band between the rollers, it is evident that a gradual turning of the roller 86 to a position parallel to the roller 85 results in an outwardly flaring of the band over a length corresponding to the length of the portion 81 of the section. The portion 82 is formed from a band of sheet metal in the same manner, but subsequently is cut from the cylindrical portion of the band as indicated at 100 at the right side of Fig. 6. The edges of the parts thus formed may be faced as found necessary in any suitable manner.

In employing drums of this character, the drum is rotated on its shaft, and fabric and rubber wound in the grooves formed between sections of the drum. After assembling the belt in this manner, fabric is wound about the drum to retain under pressure the belts within the grooves. Thereafter, the drum is placed in a vulcanizer and the belts vulcanized. It is then but a simple operation to unwind the outer layer of fabric, separate the sections of the drum and remove the finished belts.

From the foregoing description, it is apparent that an improved form of sectional drum construction has been provided in which interchangeable sections are employed that are adapted to be manufactured by inexpensive methods of stamping or casting metals and that the capacity of the drum can be varied by increasing or reducing the number of sections without materially effecting the construction.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A drum for assembling and curing endless belts, comprising a plurality of annular sections interlocked one with another in telescoping relation to form a hollow construction, a shaft, and means for supporting the end sections upon the shaft.

2. A hollow drum for assembling and curing endless belts, comprising a plurality of annular sections interlocked one with another in telescoping relation, the outer surface of the drum having circumferentially disposed grooves therein, a shaft, and means for supporting the end sections on the shaft.

3. A drum composed of a plurality of channel shape circular sections, one leg of the channel of each section being shorter than the other, the longer leg having a portion projecting parallel to the axis of the section, said portion having an outside diameter less than the inside diameter of the shorter leg of the section, whereby in assembling the sections in end to end relation, the shorter leg of each section will move over the projecting portions of the section adjacent thereto, and means for retaining the sections together.

4. A drum composed of a plurality of circular sections disposed in end to end relation, the inner periphery of each section adjacent one side being less in diameter than at the other side and a portion projecting from the side having the lesser inner peripheral diameter and in a direction parallel to the axis, such portion having an outside diameter approximately equal to the inner peripheral diameter of the other side of the section, whereby the projecting portion of one section will be partially telescoped with an adjacent section.

5. A drum composed of a plurality of annular sections of channel form, the legs of the channel projecting from the base toward the axis of the sections and being provided with axially projecting portions, means for interlocking the axial projecting portions of adjacent sections, a shaft, and means for supporting the drum on the shaft.

6. A drum comprising a plurality of annular sections, each section having an axially directed portion projecting from one side thereof and a recess at its opposite side, said portion on one section being disposed in the recess of an adjacent section, thereby interlocking the sections one with another to form a hollow construction, a shaft, and means for supporting the end sections on the shaft.

In witness whereof, I have hereunto signed my name.

Signed at Akron, in the county of Summit and State of Ohio, U. S. A., this 13th day of April, 1929.

JO D. BERWICK.